United States Patent [19]

Manome

[11] Patent Number: 4,984,297
[45] Date of Patent: Jan. 8, 1991

[54] FOUR LEVEL FREQUENCY SHIFT KEYING OPTICAL COMMUNICATION APPARATUS

[75] Inventor: Kaoru Manome, Tokyo, Japan
[73] Assignee: NEC Corporation, Tokyo, Japan
[21] Appl. No.: 263,221
[22] Filed: Oct. 27, 1988
[30] Foreign Application Priority Data
  Oct. 29, 1987 [JP] Japan ................ 62-275050
[51] Int. Cl.$^5$ ........................... H04B 10/06
[52] U.S. Cl. ...................... 455/619; 455/617
[58] Field of Search ........... 455/619, 617, 615, 606, 455/607, 611, 612; 375/48, 89; 370/3

[56] References Cited
U.S. PATENT DOCUMENTS
  4,449,247  5/1984  Waschka, Jr. .................. 455/601

FOREIGN PATENT DOCUMENTS
  0018133  1/1987  Japan ............................ 455/607

OTHER PUBLICATIONS
Hodgkinson et al; "Demodulation of Optical DPSK Using In-Phase and Quadrature Detection;" *Electronic Letters*; Sep. 12, 1985; vol. 21; No. 19; pp. 867-868.

*Primary Examiner*—Joseph A. Orsino
*Assistant Examiner*—L. Van Beek
*Attorney, Agent, or Firm*—Sughrue, Mion, Zinn, Macpeak & Seas

[57] ABSTRACT

In a four level FSK optical communication apparatus, signal light which is modulated in FSK with information is transmitted through an optical transmission line. The signal light is detected in an optical heteroclyne system by using local oscillation light, thereby producing intermediate frequency band signal which is then demodulated. A detection system comprises first and second delay detection circuits. In the first detection circuit, the intermediate frequency band signal is divided into first and second signals. The first signal is delayed by a delay time, and then mixed with a second signal which is not delayed to produce first delay detection signal. In the second delay detection circuit, one of the first signal delayed and the second signal not delayed is shifted in its phase by $\pi/2$. Then, signal having the phase shift of $\pi/2$ and signal having no phase shift are mixed to produce second delay detection signal. Thus, the demodulation of four level FSK modulation signal is performed.

6 Claims, 3 Drawing Sheets

FIG. 2
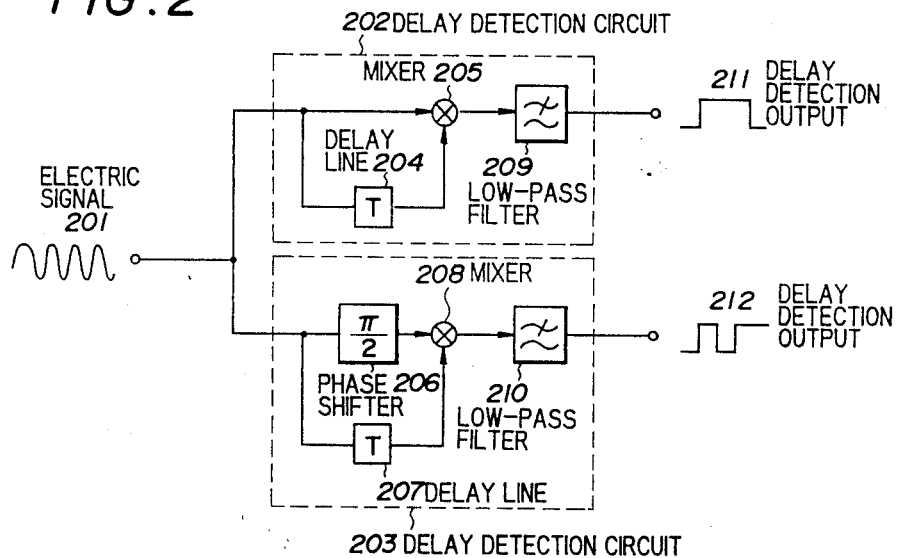
FIG. 3
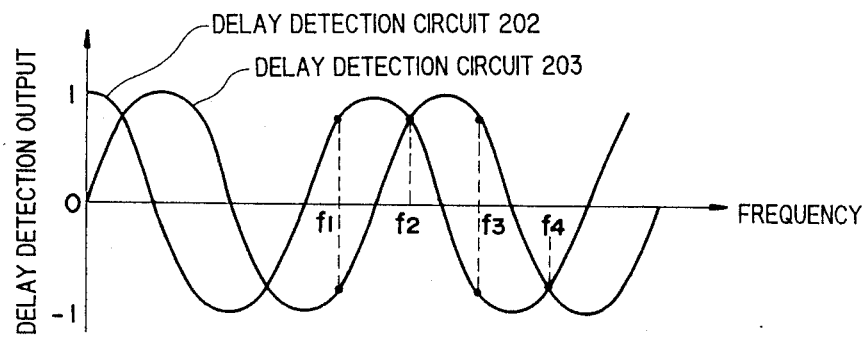
FIG. 4
| OUTPUT FRQ | DELAY DETECTION OUTPUT 211 | DELAY DETECTION OUTPUT 212 |
|---|---|---|
| f1 | $+\sqrt{2}/2$ | $-\sqrt{2}/2$ |
| f2 | $+\sqrt{2}/2$ | $+\sqrt{2}/2$ |
| f3 | $-\sqrt{2}/2$ | $+\sqrt{2}/2$ |
| f4 | $-\sqrt{2}/2$ | $-\sqrt{2}/2$ |

FOUR LEVEL FREQUENCY SHIFT KEYING OPTICAL COMMUNICATION APPARATUS

FIELD OF THE INVENTION

The invention relates to a four level Frequency Shift Keying (called "FSK" hereinafter) optical communication apparatus, and more particularly to a four level FSK optical communication apparatus in which frequency of light is modulated in accordance with informations by four levels.

BACKGROUND OF THE INVENTION

In these days, a semiconductor laser in which oscillation is performed with the single axis mode and the high spectrum purity can be utilized because the characteristic of the semiconductor laser is improved. Therefore, a coherent optical communication system in which frequency and phase of light are used for transmitting informations can be realized with the high sensitivity. In a FSK modulation system in which frequency of light is varied dependent on informations, especially, long distance transmission can be realized without any repeater because the insertion loss of an external modulator is avoided for the reason why modulated light is easily obtained in accordance with the direct modulation of light in which signal current of low levels is added to bias current of the semiconductor laser. In the FSK modulation system, transmitting signals are reproduced in accordance with the demodulation of phase informations based on frequency informations by use of a delay detection circuit etc. in which the continuous phase characteristic of frequency modulated light is utilized because the frequency modulated light obtained from the semiconductor laser directly modulated has the continuous-phase characteristic. According to such a FSK modulation system, a sensitivity which is substantially equal to that of a phase shift keying modulation system having the highest sensitivity among the various kinds of modulation systems.

In the FSK modulation system, the frequency deviation can be decreased down to a half of transmission rate which is the minimum frequency deviation necessary for the independency of signals. Therefore, the modulation spectrum band can be narrowered. Especially, research and development have been intensively promoted in a binary continuous phase FSK system which is suitable for a high speed modulation system as reported in "The experiment of 2 Gb/s optical heterodyne transmission" described in "The Technical Digest of the Institute of Electronics, Information and Communication Engineers, 1987, 70 year Anniversary National Convention Record, part 10, 2369."

On the other hand, a multiple level code communication system is an advantageous system by which a large capacity of data are transmitted in a communication system having a limited transmission capacity due to response speed of devices included therein. In such a multiple level code communication system, informations can be transmitted in capacity as much as twice in the same modulation rate in a case where, for instance, two binary codes are converted into a four level code. For this reason, the transmission capacity becomes twice by using a device of a response speed which is the same as that required in a binary code transmission.

According to the binary continuous phase FSK modulation system, however, the possibility of being applied to a detection system in a multiple level continuous phase FSK modulation system has not been studied. Therefore, a semiconductor device must be developed to increase the response speed in frequency modulation in a case where a high speed continuous phase FSK modulation system using a semiconductor laser is required to be put into a practical use.

SUMMARY OF THE INVENTION

Accordingly, it is an object of the invention to provide a four level FSK optical communication apparatus, the sensitivity of which is high to be substantially equal to that of a binary continuous phase FSK delay detection system in the same transmission capacity between the four and binary FSK optical communication apparatus.

It is a further object of the invention to provide a four level FSK optical communication apparatus in which the response speed of frequency modulation is high without the necessity for the development of a semiconductor device having a high response speed.

According to the invention, a four level FSK optical communication apparatus comprises a light source for emitting signal light. The signal light is modulated in FSK with four level transmitting signal. The FSK modulated signal light is combined in an optical coupler with local oscillation light supplied from a local oscillation light source, and combined signal light and local oscillation light are converted to intermediate frequency electric signal at an opto-electric conversion circuit. The electric signal is divided into two divided signal, one of which is delayed in a delay circuit. The delayed signal and the remaining one of the two divided signals are mixed in a first multiplier to produce first detection signal. Further, signal selected from the delayed signal and, the remaining one of the two divided signals is shift in a phase shift circuit by $\pi/2$. Then, signal having the phase shift of $\pi/2$ and signal having no phase shift are mixed in a second multiplier to produce second detection signal. Thus, FSK modulation signal is demodulated.

BRIEF DESCRIPTION OF DRAWINGS

The invention will be explained in more detail in conjunction with appended drawings wherein, FIG. 2 is a block diagram showing delay detection circuits used in the invention, FIG. 3 is an explanatory diagram showing the characteristics of the delay detection circuits shown in FIG. 2, FIG. 4 is an explanatory diagram showing relations between outputs of the delay detection circuits shown in FIG. 2 and modulating frequencies.

DESCRIPTION OF PREFERRED EMBODIMENTS

Figure 1:
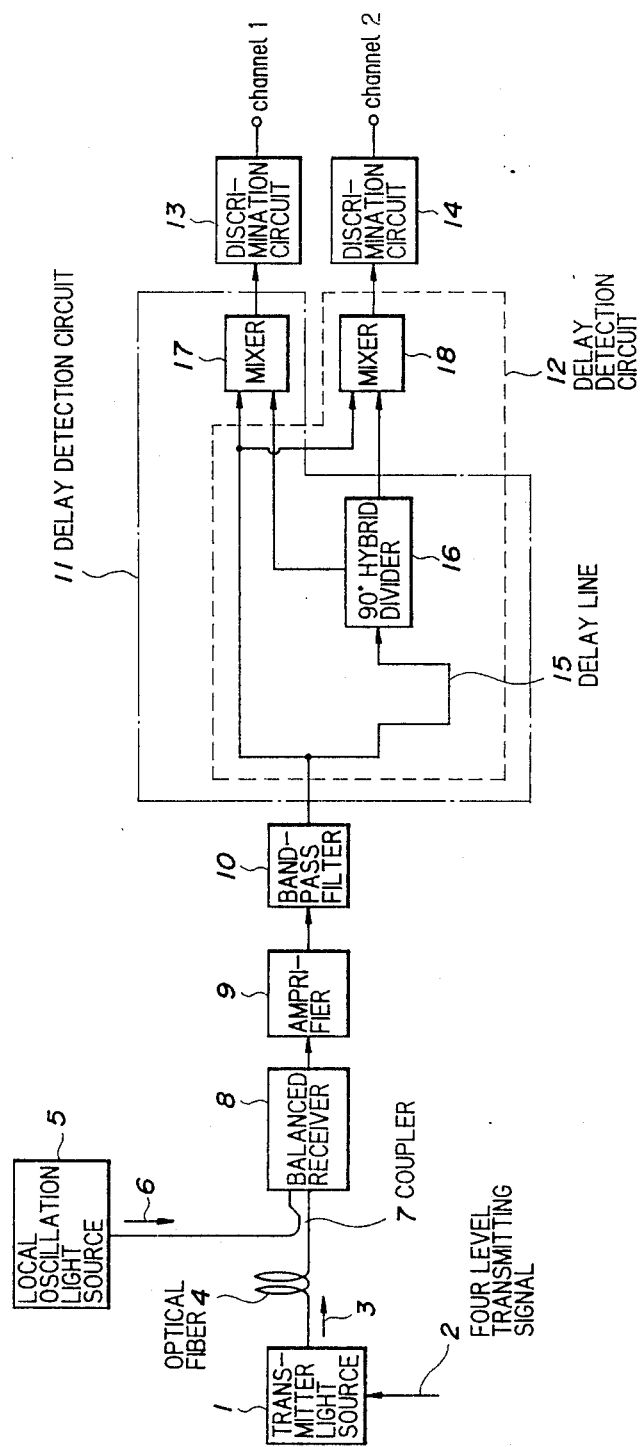
FIG. 1 is a block diagram showing a four level FSK optical communication apparatus in a first embodiment according to the invention.

In FIG. 1, there is shown a four level FSK optical communication apparatus in the first embodiment according to the invention. The four level FSK communication apparatus is applied to a continuous phase FSK modulation system in which the transmission capacity is 2×2 Gb/s, and the modulation index is 0.25, that is, intermediate frequencies $f_1$, $f_2$, $f_3$ and $f_4$ of four levels are set to be 2.25 GHz, 2.75 GHz, 3.25 GHz and 3.75 GHz. The four level FSK communication apparatus comprises a signal light source 1 of an external resonator type semiconductor laser which is directly modulated to emit signal light 3 by four level transmitting signal 2, an optical fiber 4 through which the signal light 3 is transmitted, a local oscillation light source 5 of an external resonator type semiconductor laser for emitting local oscillation light 6, a coupler 7 for combining the signal light 3 and the local oscillation light 6 to produce combined light, a balanced receiver 8 for converting the combined light into electric signal, an amplifier 9 for amplifying the electric signal, a band-pass filter 10 having low and high cut off frequencies of 2 GHz and 4 GHz, first and second delay detection circuits 11 and 2 for discriminating frequency of signal passed through the band-pass filter 10, and discrimination circuits 13 and 14 in which signals of channels 1 and 2 are discriminated. The first and second delay detection circuits 11 and 12 comprise a delay line 15 for applying a predetermined delay time to one of divided signals supplied from the band-pass filter 10, a 90° hybrid divider 16 for dividing signal propagated through the delay line 15 into two signals, and mixers 17 and 18 for mixing non-delayed signals and the two signals supplied from the 90° hybrid divider 16 correspondingly as shown in FIG. 1.

In operation, the light source 1 of the semiconductor laser is directly modulated to emit the signal light 3 by the four level transmitting signal 2, so that the frequency of the signal light 3 is modulated with four levels of continuous phase having the frequency separation of 0.5 GHz. The signal light 3 thus modulated is transmitted through the optical fiber 4, and then combined in the coupler 7 with the local oscillation light 6 supplied from the local oscillation light source 5. The light thus combined has the beat spectrum width of 1 MHz and is received in the balanced receiver 8 to be converted into the electric signal which is then amplified in the amplifier 9. The amplified electric signal of a predetermined band is passed through the band-pass filter 10, and then supplied to the delay detection circuits 11 and 12. In the delay detection circuits 11 and 12, the signal is delayed through the delay line 15 by the predetermined delay time, and divided in the 90° hybrid divider 16 into the two signals having the phase shift of 90° ($\pi/2$). The two signals thus divided are supplied to the mixers 17 and 18 in which the two divided signals are mixed with the non delayed signals respectively. Thus, the frequency discrimination of the signal is performed in the delay detection circuits 11 and 12. Finally, the signal diserimination of the channels 1 and 2 is performed in the discrimination circuits 11 and 12.

FIG. 2 shows first and second delay detection circuits 202 and 203 which are used in place of the first and second delay detection circuits 11 and 12 in the first embodiment. The first and second delay detection circuits 202 and 203 comprise delay lines 204 and 207, mixers 205 and 208, and low-pass filters 209 and 210, respectively. The second delay detection circuit 203 further comprises a $\pi/2$ phase shifter 206 inserted parallel to the delay line 207.

FIG. 3 shows the characteristics of the first and second delay detection circuits 202 and 203 having the phase shift difference of $\pi/2$. If it is assumed that the four frequency levels are $f_1$, $f_2$, $f_3$ and $f_4$ as shown in FIG. 3, two outputs of the first and second delay detection circuits 202 and 203 are obtained as shown in FIG. 4. Therefore, electric signal 201 supplied to the input of the delay detection circuits 202 and 203 is discriminated as signals of channels 1 and 2 dependent on the positive and negative values and combination of delay detection outputs 211 and 213. Absolute value of the delay detection outputs 211 and 212 is "$\sqrt{2}/2$" less than "1" which is obtained in a continuous phase FSK delay detection system. Therefore, the demodulation efficiency is decreased as compared thereto. If it is compared in regard to the sensitivity, the difference turns to be 3 dB. That is, the four level FSK optical communication apparatus is identical to a binary continuous phase FSK delay detection system in terms of the transmission capacity versus the sensitivity.

The function between the delay time T by which the delay detection characteristics as shown in FIG. 3 are obtained and the modulation index m is defined as follows $$T = \frac{1}{4mB}$$

where B is a bit rate of the transmitting signal. As apparent from the above equation, the delay time T is set to be one bit in the first embodiment.

As understood from the first embodiment, a four level FSK optical communication apparatus in which the transmission capacity becomes twice as compared to a binary code transmission system without the burden on the response speed of frequency modulation in a light source.

Although the receiving sensitivity of the invention is 4 GB/s which is almost the same as in a binary continuous phase FSK delay detection system having the bit rate of 4 Gb/s, the intermediate frequency band of the invention is approximately a half of that in the binary continuous phase FSK detection system. This means that the invention is advantageous in realizing a system of a large capacity in accordance with the frequency multiplexing etc.

Figure 5:
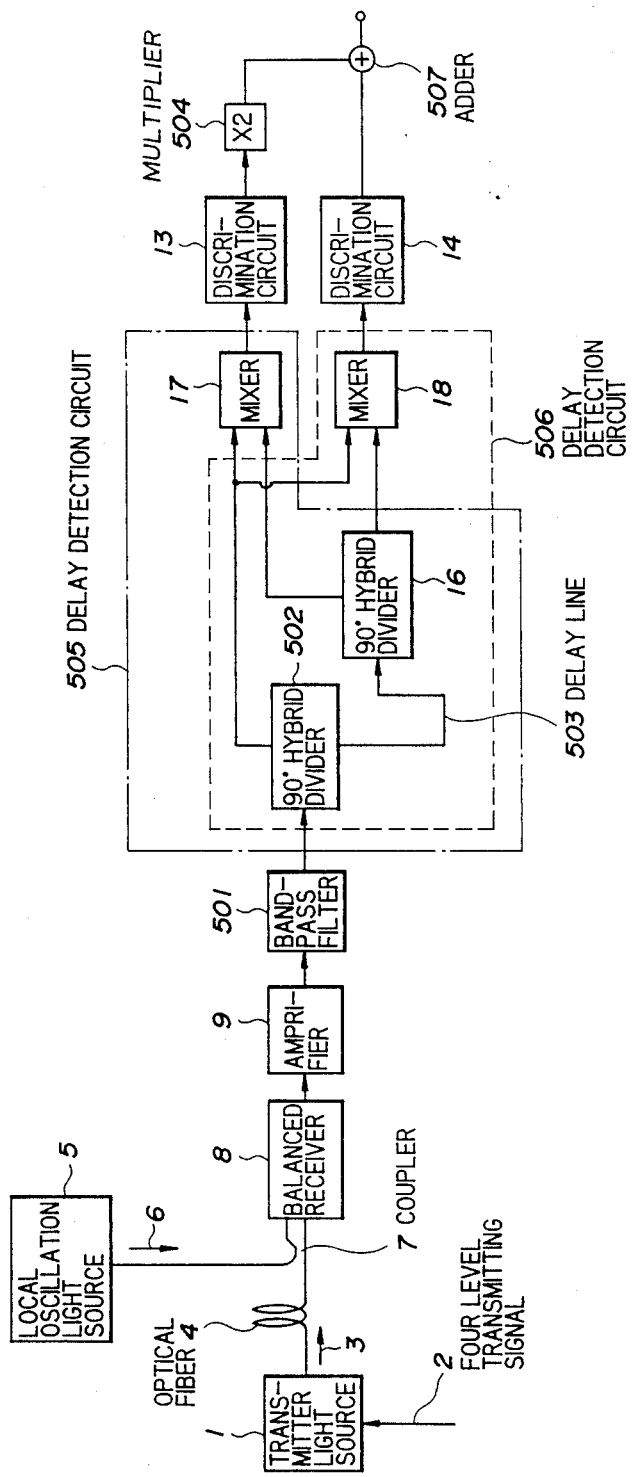
FIG. 5 is a block diagram showing a four level FSK communication apparatus in a second embodiment according to the invention.

In FIG. 5, there is shown a four level FSK optical communication apparatus in the second embodiment according to the invention. In the four level FSK optical communication apparatus in which like parts are indicated by like reference numerals in the first embodiment except that 501 indicates a band-pass filter, 502 a further provided 90° hybrid divider, 503 a delay line, 504 a newly inserted multiplier, 505 and 506 first and second delay detection circuits, and 507 an adder. The light source 1 is composed of a semiconductor laser having the spectrum width of 1 MHz and the cut-off frequency of 1 GHz in frequency modulation. The modulating signal 2 is four level signal having the bit rate of 1 Gb/s which is equal to the bit rate of 2 Gb/s in a binary system, and the modulation index m is set to be as large as "0.5" which is twice that in the first embodiment for the limited tolerance of the spectrum width. In the provision of the multiplier 504 and the adder 505, binary signals of two channels which are demodulated are again converted to a four level signal. This means that the four level FSK optical communication apparatus in the second embodiment operates as a repeater system. The delay line 503 is set to be the length by which ½ bit is delayed in accordance with the aforementioned equation to which the modulation index m (=0.5) is applied. In the second embodiment, respective signal frequencies in the intermediate frequency band are set on the lower frequency side because the base band signal band can be half as compared to that in the first embodiment because of the lowered transmission rate which is half that in the first embodiment. More specifically, the modulating frequencies $f_1$, $f_2$, $f_3$ and $f_4$ are 1.25 GHz, 1.75 GHz, 2.25 GHz and 2.75 GHz, respectively. Consequently, the band for the band-pass filter 501 through which the intermediate frequency signal is passed is adapted thereto, such that the low-band cutoff frequency is 1 GHz, and the high-band cut-off frequency is 3 GHz.

As explained above, a 2×1 Bb/s four level FSK optical communication repeater system in which the spectrum width tolerance of a light source is moderate and the light source is not heavily burdened in the response speed for frequency modulation can be provided in the second embodiment. In the repeater system, the receiving sensitivity is −40 dBm which is approximately identical to a 2 Gb/s binary continuous phase FSK delay detection system.

A four level FSK optical communication apparatus according to the invention may be modified, for instance, such that an unity semiconductor laser is possible to be adopted therein because the spectrum width tolerance of a light source can be large if a delay detection circuit is optimized in compliance with the modulation index which is set to be large. Furthermore, the four level FSK optical communication apparatus can be applied to a frequency division multiplexing transmission of high density because the intermediate frequency signal band is narrow.

Although the invention has been described with respect to specific embodiment for complete and clear disclosure, the appended claims are not to thus limited but are to be construed as embodying all modification and alternative constructions that may occur to one skilled in the art which fairly fall within the basic teaching herein set forth.

What is claimed is:

1. A four level FSK optical communication apparatus comprising,
    a light source for emitting a signal light modulated in FSK with a four level transmitting signal,
    a local oscillation light source for emitting a local oscillation light,
    an optical coupler for combining said signal and local oscillation lights to produce a combined light,
    means for converting said combined light to an intermediate frequency signal,
    means for dividing said intermediate frequency signal into first and second intermediate frequency signals,
    means for delaying said second intermediate frequency signal to produce a delayed intermediate frequency signal,
    a phase shift means for shifting a phase of said delayed intermediate frequency signal by $\pi/2$ to produce a phase shift intermediate frequency signal,
    a first mixing means for mixing said phase shift intermediate frequency signal and said first intermediate frequency signal to produce a first delay detection signal, and
    a second mixing means for mixing said delayed intermediate frequency signal and said first intermediate frequency signal to produce a second delay detection signal.

2. A four level FSK optical communication apparatus according to claim 1,
    wherein said delay means is a delay line, and
    said phase shift means is a 90° hybrid divider which is connected at its input to said delay line.

3. A four level FSK optical communication apparatus, according to claim 1, wherein:
    said dividing means is a 90° hybrid divider having one input for receiving said intermediate frequency signal and two outputs for supplying said first and second intermediate frequency signals, one of which is shifted in phase by $\pi/2$.

4. A four level FSK optical communication apparatus according to claim 1 further comprising,
    means for producing four level modulation signal which is then propagated through a transmission line in accordance with said first and second delay detection signals.

5. A four level FSK optical communication apparatus according to claim 1, wherein:
    said dividing means is a lead having one input for receiving said intermediate frequency signal and two outputs for supplying said first and second intermediate frequency signals.

6. A four level FSK optical communication apparatus, comprising:
    a light source for emitting a signal light modulated in FSK with a four level transmitting signal;
    a local oscillation light source for emitting a local oscillation light;
    an optical coupler for combining said signal and local oscillation lights to produce a combined light;
    means for converting said combined light to an intermediate frequency signal;
    means for dividing said intermediate frequency signal into first and second intermediate frequency signals;
    a first delay means for delaying said first intermediate frequency signal to produce a first delayed signal;
    a phase shift means for shifting a phase of said second intermediate frequency signal to produce a phase shift signal;
    a second delay means for delaying said second intermediate frequency signal to produce a second delayed signal;
    a first mixing means for mixing said first delayed signal and said first intermediate frequency signal to produce a first delay detection signal; and
    a second mixing means for mixing said second delayed signal and said phase shift signal to produce a second delay detection signal.

* * * * *

UNITED STATES PATENT AND TRADEMARK OFFICE
CERTIFICATE OF CORRECTION

PATENT NO.  : 4,984,297
DATED       : January 8, 1991
INVENTOR(S) : Kaoru Manome It is certified that error appears in the above-identified patent and that said Letters Patent is hereby corrected as shown below:

Column 3, line 16, delete "2" and insert --12--.

Signed and Sealed this

Twenty-ninth Day of September, 1992

Attest:

DOUGLAS B. COMER

*Attesting Officer*    *Acting Commissioner of Patents and Trademarks*